UNITED STATES PATENT OFFICE.

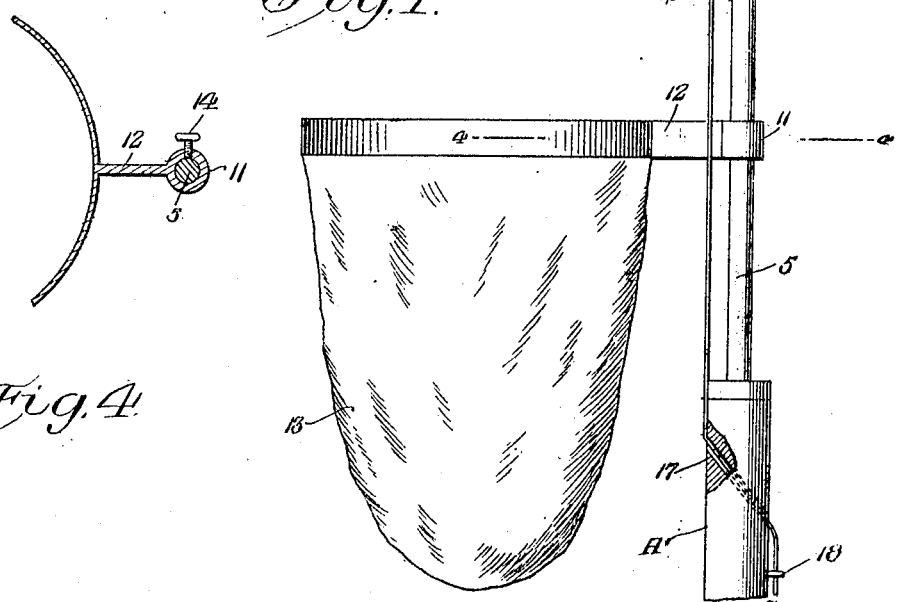

DEMSTER K. KOSICH, OF MILWAUKEE, WISCONSIN.

FRUIT-PICKER.

1,308,677. Specification of Letters Patent. Patented July 1, 1919.

Application filed December 7, 1917, Serial No. 206,082. Renewed April 18, 1919. Serial No. 291,169.

*To all whom it may concern:*

Be it known that I, DEMSTER K. KOSICH, a citizen of the United States, residing at Milwaukee, in the county of Milwaukee and State of Wisconsin, have invented new and useful Improvements in Fruit-Pickers, of which the following is a specification.

The invention relates to a fruit picker, and more particularly to the class of combined cutters and holders for fruits, flowers or the like.

The primary object of the invention is the provision of a device of this character wherein the construction thereof is novel in form so that fruit, flowers or the like can be cut and gathered with despatch and at the same time without bruising or otherwise damaging the same.

Another object of the invention is the provision of a device of this character wherein the receiver for the fruit, flowers or the like is adjustably mounted so that it can be swung into operative position and fastened or can be moved to inoperative position and held therein, while the standard for supporting the receiver carries a cutter to permit the convenient cutting of the fruit from trees or the shearing of flowers or the like.

A further object of the invention is the provision of a device of this character which is extremely simple in construction, thoroughly reliable and efficient in its operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a side elevation of a device constructed in accordance with the invention;

Fig. 2 is a top plan view thereof with part of the spring broken away;

Fig. 3 is a fragmentary vertical sectional view;

Fig. 4 is a sectional view on the line 4—4 of Fig 1 with the cord 16 omitted.

Similar reference characters indicate corresponding parts throughout the several views of the drawings.

Referring to the drawings in detail, A designates a pole or stick preferably made from bamboo, although the same may be made from any other suitable material and can be of any required length.

Mounted in one end of the pole or stick A is the stem 5 to which the stationary member 6 of the cutting shears is connected. The movable member 7 of said shears is pivoted to the stationary member, while both members are at substantially right angles to the stem and are formed rearwardly of the pivot connecting the said members or on the lever portions thereof with centering lugs 8 for engaging the outermost convolutions of a coiled expansion spring 9, the ends of which are passed through and secured in eyes or holes 10 formed in said member, and in this manner the spring 9 is held fixed and in operative position between the members for normally holding the cutting portions thereof open.

Slidably and rotatably mounted upon the stem 5 is the sleeve-like runner 11 of a hook 12 in which is fastened a pail 13 having a receiver, and this pail is adapted to be positioned below the shears for the catching of fruit, flowers or the like cut by said shears in the use of the device, although it is obvious that the hook 12 with the pail 13 can be swung arcuately on the pole or stick A to an inactive position, while threaded in the runner 11 is a set screw 14 which permits the fastening thereof in adjusted position upon the stem 5, as will be clearly apparent.

Swiveled on the lever portion of the member 6 adjacent to the stem 5 integral therewith is a guide pulley 15, through which is trained an operating cable 16, one end of which is suitably fastened to the lever portion of the member 7, while the major portion of said cable 16 is trained through a diagonally disposed guideway 17 formed in the pole or stick A and also through eye members 18 on the latter, with the opposite end of the said cable 16 free so that it can be manually gripped and pulled upon for actuating the shears in the cutting operation.

It is apparent that the pail can be adjusted close to or spaced the desired distance away from the plane of the shears so as to assure the positive catching of the fruit, flowers or the like when cut by the shears. Attention is also directed particularly to the disposition of the spring 9 which is out of the way so as to avoid any possibility of interference therewith in the manipulation of the device while in use or interference with the activity of the spring.

When the shears are brought into action for the cutting of fruit, flowers or the like and the receiver is in operative position, said severed fruit, flowers or the like will fall into the pail to be caught thereby, thereby enabling the gathering of fruit, flowers or the like with despatch.

From the foregoing description, taken in connection with the accompanying drawings, the construction and manner of use of the herein described fruit picker will be readily apparent and, therefore, a more extended explanation has been omitted.

Having thus described my invention, I claim:

A fruit picker comprising a pole having an inclined opening therein, a stem on said pole, a pair of shears consisting of two straight members pivotally connected together, one of said members being rigidly connected with the end of said stem, a swiveled pulley carried by said last mentioned member, a cord connected with the other member and passing over the pulley and down the stem and through the opening, and a receptacle having a socket adjustably engaging the stem.

In testimony whereof I affix my signature.

DEMSTER K. KOSICH.

Copies of this patent may be obtained for five cents each, by addressing the "Commissioner of Patents, Washington, D. C."